Feb. 20, 1968   H. J. SRSEN   3,369,431
WRENCH
Filed Nov. 30, 1966

INVENTOR
HENRY J. SRSEN
BY
Ely and Golrick
ATTORNEYS

United States Patent Office 3,369,431
Patented Feb. 20, 1968

3,369,431
WRENCH
Henry J. Srsen, 6510 Ridgeburg Blvd.,
Mayfield Heights, Ohio 44124
Filed Nov. 30, 1966, Ser. No. 597,933
7 Claims. (Cl. 81—53)

ABSTRACT OF THE DISCLOSURE

An internal or external surface gripping, work-end approaching apparatus comprising an internally toothed ring gear joined to a casing to which external torque is applied; a coaxial sun gear; planetaries meshed between the gears, each bearing endwise projecting eccentric work-gripping surfaces and loosely supported in the casing allowing cocking of the axes out of parallelism with the sun and ring gear axes; and an external accessible sun gear rotating handle for setting the planetaries into work-gripping relation with cocked axes thereby to effect a gearing lock-up, avoiding increasing radial forces on the work with increasing external torque application.

---

The present invention relates to a wrench in the broader sense of a device for torsional engagement of an object; and more particularly to a device of the character described adjustable for gripping or engaging such objects upon curved inside or outside surfaces thereof.

Hereinafter the invention will be described as embodied in a hand wrench adapted to engage inside or outside surfaces of an object such as pipe, but it is to be understood that certain features of the invention are adaptable to other applications.

In addition to ordinary pipe wrenches and the like for engagement of external cylindrical surfaces by opposed serrated jaws or by wrap-around frictional strap-type engagement, and various chuck-like devices having jaws expandible or contractable to grip an internal or external cylindrical surface, there are known in the prior art chuck-like wrench devices in which a plurality of pivotally mounted gripping elements have gear or toothed portions engaged with a central gear, or with a ring gear formation of an externally impelled casing wherein external torque applied to the casing swings the gripping portions into a gripping engagement both accommodated to an internal or external curved surface of the object and also increasing in gripping force with the torque communicated to the object. In such as the last named devices, as in ordinary pipe wrenches, the gripping forces thus increasing with the applied torque strongly tend to distort the object gripped, to crush inwardly particularly externally engaged hollow objects such as pipe or similarly to expand or distort internally engaged hollow tubular objects.

The present invention proposes the use of a ring gear secured to an externally impelled casing, a sun gear, a plurality of like planetary elements meshed therebetween each bearing a respective axially projecting eccentric gripping portion, and a grip adjusting and setting, sun gear rotating handle; the planetary pinions being retained in such manner as permits some degree of cocking or angular displacement of the planetary axes out of parallelism with the sun and ring gears when the sun gear handle is rotated to bring the gripping portions into gripping internal or external engagement with an object, thereby to lock up the gearing system, so that though torque is communicated from the ring gear to the object through the gripping elements, it is so done without causing rotation of the planetaries but merely a possible further cocking of the planetaries to a maximum which firms the gearing lock-up and therefore without increase of gripping force radially of the gripped surface. For example, a hand type wrench embodying this invention is particularly advantageous for screwing short nipples, internally engaged, in and out of fittings, or for removal of threaded pipe ends broken off in fittings; or similarly manipulating externally engaged short internally threaded collars or sleeves.

It is an object of the present invention to provide an improved type of wrench device or mechanism adapted for use in or as a tool or the like intended to engage an internal or external arcuate, particularly cylindrical, surface. A still further object is to provide a device or tool of the character described wherein the gripping force or engagement is developed independently of the magnitude of the torque communicated through the device to the object engaged.

Another object of the present invention is to provide a tool or device of the character described which minimizes or eliminates forces crushing or distorting an engaged object arising by virtue of gripping action dependent upon and increasing with torque applied through the device to the object.

A still further object is the provision of a tool device adapted for easy manipulation and convenient engagement with surfaces often awkward to grip.

Other objects and advantages will appear from the following description and the drawings wherein.

Figures 1, 2:
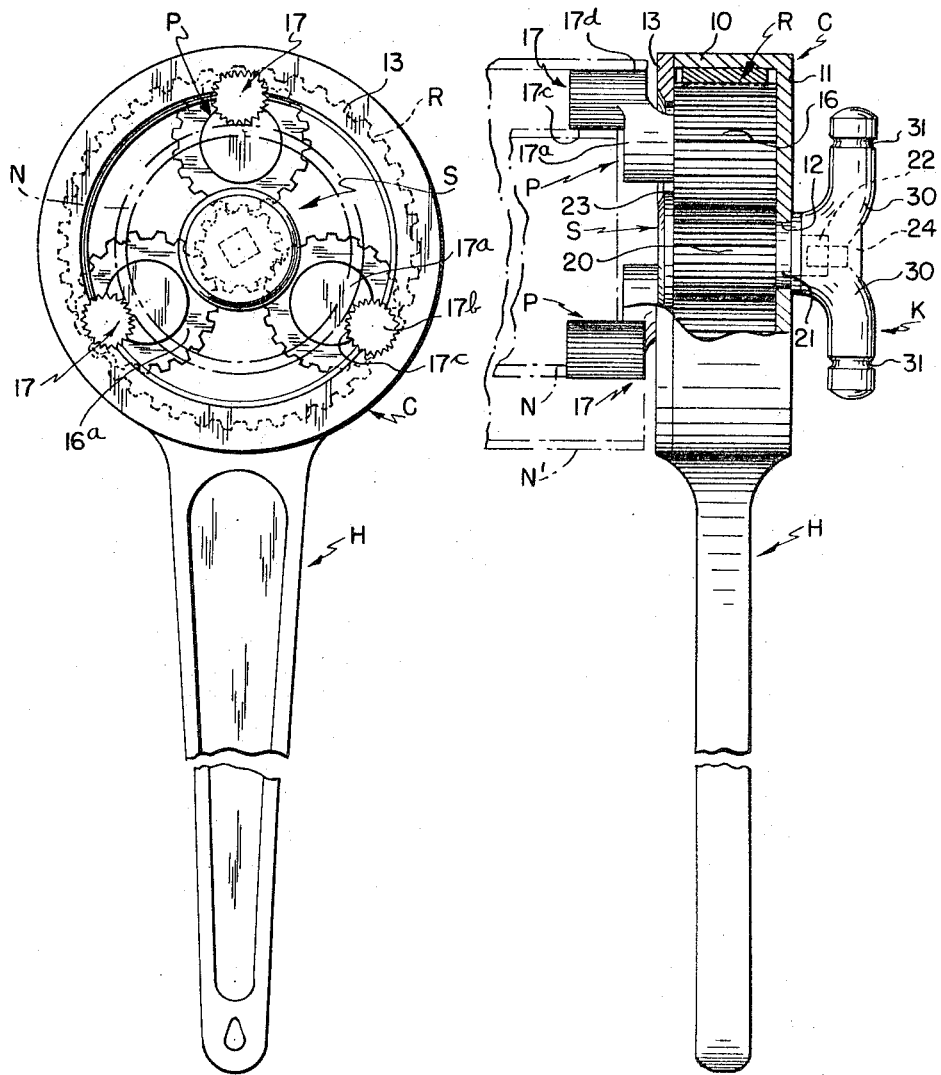
FIG. 1 shows a hand wrench embodying the present invention in an elevational view of the work engaging face thereof.
FIG. 2 is a side view of the tool represented in FIG. 1 with certain portions broken away for clarity of representation.
Figure 3:
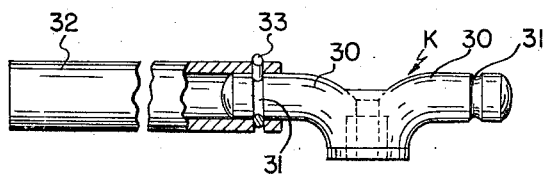
FIG. 3 is a modification of the grip setting handle.

In the drawings, FIGS. 1–3, the present invention is represented as embodied in a hand wrench useful, for example, for endwise engagement of pipe nipples or other objects having endwise accessible internal or external surfaces such as cylindrical surfaces suitable for tool engagement and torque application.

The principal components of the invention, as represented in the wrench of FIGS. 1–3, are a hollow casing or head C; an internally toothed ring gear R which may be integral with the casing; a handle H on the casing for application of torque through the casing to the ring gear; a sun gear S rotatably mounted in the casing and rotatable relative to the casing by an adjusting means, such as a setting knob or wing-grip element K; and a plurality of planetary-type gripping elements P, here three, having planetary gear portion substantally symmetrically spaced about the working axes of the tool, that is, of the sun gear and ring gear, and meshing with the latter gears, the elements P further having object gripping portions or formations, each axially projecting in generally parallel relation beyond the end of the sun gear and eccentrically disposed relative to the respective planetary pinion.

The casing C here comprises a circumferential wall portion 10 closed at one end by a flat radial wall portion 11 centrally apertured at 12 and at its other end having an inward lip 13. Depending on mode of fabrication the lip may be integral; or welded or otherwise secured in place if the ring gear is a separate element to be secured within a cylindrical recess defined by cylindrical interior of wall 10. Preferably the tooth formations of the ring gear terminate endwise in spaced relation to the wall 11 and lip 13 respectively.

Here the radial handle H is shown rigidly attached and in effect integral with the casing C as a structural form here preferred for the sake of simplicity to any ratcheting arrangement between the handle and the casing to be rotated, such as those known in the prior art for other rotational tools.

Each planetary gripping element P includes a planetary gear or pinion portion 16, of length slightly less than the spacing between the opposed faces of the lip 13 and wall 11 to allow slight cocking of its axis, with a flat inner end face endwise supported on or riding on the interior face of the wall 11. The other end has an integral endwise projection indicated generally by the reference numeral 17 providing gripping surface portions 17c, 17d eccentric from the planetary axes; and the adjacent end face of the pinion portion is provided with a circumferentially continuous flat area 16a extending inwardly beyond the roots of the planetary teeth to accommodate and to be engaged by the inside face of the lip 13 and a similar retaining lip 23 on the sun gear.

The planetary gripping elements may be fabricated as integral units; or by forming the pinion portion 16 with a central reduced short stub portion 17a to the circumference of which is welded an axially projecting longer serrated cylindrical body 17b thereby affording a complete cylindrical longitudinally serrated surface formation 17c at an axial location beyond the stub, and an interrupted cylindrical formation 17d overlapping the stub. From accepted design considerations, the triangular ribs constituting the serrations have a 30° to a preferred 45° tooth form.

The sun gear S is here shown as a integral element having the toothed gear portion 20 with inner end reduced for approximately the thickness of the wall 11 to a round portion 21 rotatably supported and journalled in the wall aperture 12, and extending therebeyond in a square-sectioned portion 22 whereon is received the correspondingly square broached hub socket of the winged knob element K. The latter is axially secured thereon by a self-locking screw 24 through the counter-sunk hub aperture threaded into the female threaded end of 22. The element K with hub bearing on wall 11 thus serves to hold the sun gear in place and thereby the planetaries P, as well as serving as an adjustment and grip setting handle. Though the device K may be merely a knurled knob element, preferably it is a winged handle element as here shown to afford better manual purchase.

The opposite end of the sun gear S further includes the integral lip 23 extending outwardly beyond the crests or tops of the sun gear teeth to overlap in retaining relation the aforementioned flat peripheral end portion 16a of the several pinions of the planetaries.

Meshing relation of the planetaries between sun and ring gear in their equally spaced relation about the axes is such further that each of the planetaries is similarly phased in its mesh with reference to the position of the projection 17; in other words, the planetaries are so meshed that at all times within the limits of tolerances of the parts, corresponding parts of the projecting portions 17 are at the same radial distance from the axis of the system.

In a typical arrangement with a stub tooth form, the ring gear had forty-two teeth and 2.625 inches pitch diameter; the planetaries sixteen teeth with 1.000 inch pitch diameter; the sun gear nine teeth and a 0.5625 inch pitch diameter.

In this arrangement a certain cocking or angular play of the axes of the planetaries is permitted, in order to obtain a lock-up of the gearing upon adjustment handle K being tightened to grip a work piece with torque then applied at handle H.

In detail FIG. 3 a modification is shown whereby a removable extension of the adjustment handle K is conveniently used and available. The diametrically aligned cylindrical wing portions 30, each with a semi-round sectioned circumferential groove 31 are adapted to be received in the end of a sturdy tubular extension handle 32, detachably held thereon by a spring wire clip 33 retained in diametrically opposed tube slots. The extension facilitates the application of force to the sun gear and therethrough to the planetary grippers to obtain a "bite" on the object to be turned and, if desired, as well the handling of the tool in torque application while turning the gripped object.

In use, for example, to engage the inside of, and unscrew, a pipe nipple (N' in dashed outline of FIG. 2) or perhaps a piece of pipe broken off in a fitting or fixture, ordinary right hand threads assumed, by rotation of the adjusting handle K the mutual spacing of the gripping end projection 17c is adjusted to permit entry into the bore of the object to be gripped, then turned clockwise to force the gripping surfaces into work biting and gripping relation, and thereupon force is applied at the wrench handle to unscrew the work. Operation in opposite sense would, of course, be used to screw a nipple in.

On the other hand, where the external circumference of an object (N in dashed outline of FIG. 1) is to be gripped, the tool is similarly adjusted by the handle K to bring the gripping surfaces, especially the continuous long surface from 17d through 17c into engagement at spaced points with the circumference of the object, the knob tightened up for gripping engagement, and then with torque applied at handle H; the functioning of the tool being essentially identical to that already described.

The versatility of an apparatus incorporating this invention is apparent from the fact that a wrench embodiment like to that of the drawings has been found by no means restricted to use for circularly cylindrical inside or outside surfaces, but has provided an effective engagement with various other internal and external prismatic and cylindrical surfaces, such as elliptical cylinders, square, hexagonal and other polygonal prismatic forms, or even irregular shapes, as are now not infrequently encountered in heads or sockets of fasteners, or drum plugs and bungs; and as well with external spherical surfaces, or toroidal surfaces.

Generally speaking, it is possible to provide a functional tool of sufficient ruggedness using either the lip 13 or the lip 23 for retention of the planetary elements P within the casing; for simplicity providing lip 23 as the preferred single lip form. However, as a preferred form both lips 13 and 23 are provided, as lip 13 affords a dirt shield for the ring gear. The lip 13, after a finished ring gear portion R is positioned in the casing, may be simply welded onto the end of the casing C as shown, or if desired may be secured by a plurality of screw fasteners therethrough threaded into the casing endwise. The ring gear R may be integrally formed on the internal circumference of a suitable blank for the casing with the aperture 12 thereafter formed or reamed to coaxial relation, there being suitable undercuts to provide the above discussed spacing between ends of the ring gear teeth with respect to the wall 11 and the opposite end of the circumferential wall 10; and the gear then cut by suitable means; or with the cylindrical interior surface formed in the wall 10 now coaxial with the aperture 12, a separate internally toothed ring gear element of appropriate length may then be pressed into place and secured by welding or other means. With modern casting methods, it has been found that the casing 10, handle H and ring gear R may be formed as a casting.

I claim:
1. A device for gripping an object on varied surface portions thereof, to which object a torsional force is to be applied, comprising:
    a casing including
        an internal ring gear formation rotationally driveable thereby,
        and an endwall perpendicular to the ring gear axis, said casing adapted for application of an external torque thereto;
    a sun gear rotatably secured in said wall within said housing coaxially of said ring gear;
    a plurality of like object gripping elements each including a planetary gear meshed with said sun and ring gears for rotation and translation in said casing and axially supported at one end by said wall, and also including at the other end of the planetary gear an object gripping projection beyond the ring gear having a gripping surface eccentric of the plentary gear axis, said gripping elements being symmetrically spaced about the sun gear axis and so meshed that the gripping surfaces are equally spaced from the sun gear axis;

means for retaining sid gripping elements in said casing, meshed between said ring gear and sun gear;

and sun gear rotating means accessible from the exterior of said casing for rotating the planet gears and thereby adjusting said gripping surfaces into gripping engagement with said surface portions of an object;

said planetary gears cockable out of parallel with the sun gear axis to lock up the several gears after rotation of the sun gear to bring the gripping projections into engagement with an object upon torque application through the casing.

2. A device as described in claim 1, wherein said sun gear at one end has an integral shaft journalled in and projecting through a central aperture of said wall, and having a winged handle on the outer end thereof as said sun gear rotating means; and said casing is provided with a dirt shield inward lip over the end of the ring gear distal from said wall.

3. A device as described in claim 1, wherein said sun gear at one end has an integral shaft journalled in and projecting through a central aperture of said wall and sun gear retaining means secured on the shaft and bearing against said wall; a handle means being provided on the outer end of said shaft as said sun gear rotating means; and said sun gear being provided with a planetary retaining outward lip over the ends of the planetary gears distal from said wall.

4. A device as described in claim 1 including three said gripping elements, each having a plurality of gripping surfaces at distinct axial locations; said gripping surfaces serrated.

5. A wrench comprising a device as described in claim 1, wherein said casing is provided with a radially extending handle for torque application; and three said gripping elements are provided.

6. A wrench as described in claim 5, wherein said sun gear at one end has an integral shaft journalled in and projecting through a central aperture of said wall and having a winged handle secured on the outer end thereof as said sun gear rotating means; said winged handle having a hub portion bearing against said end wall as a sun gear retaining means; and said sun gear is provided with a planetary retaining outward lip over the ends of the planetary gears distal from said wall; said gripping surface serrated.

7. A wrench as described in claim 5, wherein said sun gear at one end has an integral shaft journalled in and projecting through a central aperture of said wall and sun gear retaining means secured on the shaft and bearing against said wall; a handle means being provided on the outer end of said shaft as sun gear rotating means; and said sun gear being provided with a planetary retaining outward lip over the ends of the planetary gears distal from said wall.

References Cited
UNITED STATES PATENTS

| | | | |
|---|---|---|---|
| 1,140,567 | 5/1915 | Boring | 81—53 |
| 1,334,487 | 3/1920 | Edwards. | |
| 2,800,043 | 7/1957 | Young | 81—72 |

JAMES L. JONES, JR., *Primary Examiner.*